(12) United States Patent
Anderson

(10) Patent No.: US 8,015,154 B1
(45) Date of Patent: Sep. 6, 2011

(54) STARTING DATABASE SOFTWARE IN RESPONSE TO A BROADCAST MESSAGE

(75) Inventor: David J. Anderson, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 1356 days.

(21) Appl. No.: 10/862,719

(22) Filed: Jun. 7, 2004

(51) Int. Cl.
 *G06F 17/30* (2006.01)
(52) U.S. Cl. ........................................ 707/638; 707/695
(58) Field of Classification Search .............. 707/1, 200, 707/638, 695
 See application file for complete search history.

(56) References Cited

U.S. PATENT DOCUMENTS

| | | | | |
|---|---|---|---|---|
| 4,797,672 A | * | 1/1989 | Kousa | 340/5.26 |
| 5,357,630 A | * | 10/1994 | Orescu et al. | 707/10 |
| 5,561,770 A | * | 10/1996 | de Bruijn et al. | 709/225 |
| 5,931,916 A | * | 8/1999 | Barker et al. | 709/239 |
| 6,014,669 A | * | 1/2000 | Slaughter et al. | 707/10 |
| 6,889,221 B1 | * | 5/2005 | Luo et al. | 707/2 |
| 7,634,477 B2 | * | 12/2009 | Hinshaw | 707/10 |
| 2003/0172054 A1 | * | 9/2003 | Berkowitz et al. | 707/1 |
| 2004/0181517 A1 | * | 9/2004 | Jung et al. | 707/3 |

FOREIGN PATENT DOCUMENTS

EP 1160666 A2 * 12/2001

OTHER PUBLICATIONS

J. Postel, "User Datagram Protocol," RFC 768, pp. 1-3 (Aug. 28, 1990).
Information Science Institute, RFC 793, "Transmission Control Protocol," pp. 1-88 (Sep. 1981).
U.S. Appl. No. 09/560,417, filed Apr. 27, 2000, Bruce J. Frost et al.

* cited by examiner

*Primary Examiner* — Hosain T Alam
*Assistant Examiner* — Johnese Johnson
(74) *Attorney, Agent, or Firm* — Trop, Pruner & Hu P.C

(57) ABSTRACT

A database system that has a plurality of nodes determines whether each node has a first version of database software. A broadcast message is sent from a first node of the database system to other nodes of the database system. In response to the broadcast message, at least each of at least some of the other nodes starts a software module to perform a task with respect to the database software executable in each node.

18 Claims, 3 Drawing Sheets

STARTING DATABASE SOFTWARE IN RESPONSE TO A BROADCAST MESSAGE

BACKGROUND

A database system stores collections of logically related data. One common type of database system is the relational database management system (RDBMS), which stores data in tables (or relations) that are arranged as rows and columns. To access data in a database system, requests according to a standard database query language are submitted to the database system to retrieve, update, or to delete data, as well as to manipulate various objects in the database system, including tables, definitions of tables, and so forth.

In certain applications, such as data warehousing applications, large amounts of data are stored in a database system. To provide rapid access of data contained in the database system, some database systems are implemented as parallel database systems. An example of a parallel database system is the TERADATA® database system from NCR Corporation. Some parallel database systems include a plurality of nodes, with each node having one or multiple processors. The nodes of the parallel database system are coupled by a network to enable intercommunication among the nodes. Tables are distributed across the nodes such that different portions of each table can be accessed concurrently in response to queries submitted by users.

An issue associated with a parallel database system having multiple nodes is that different versions of software may be stored on different nodes. Database administrators are continually updating database software to improve performance of database systems. To ensure that each of the nodes of a parallel database system is running the same version of software, a reconciliation procedure is usually performed to check the version of database software running on each node.

To perform the reconciliation of software versions running on the nodes of a parallel database system, inter-node communications are usually performed. Conventionally, in a reconciliation procedure, inter-node communications use point-to-point connections (e.g., TCP/IP or Transmission Control Protocol/Internet Protocol connections) between any two nodes. If a parallel database system has a large number of nodes (e.g., hundreds or thousands of nodes), the point-to-point connections that have to be established between nodes in a conventional parallel database system can take up a large amount of time. Thus, the reconciliation procedure, which is usually performed at system restart, can take a relatively long period of time to run.

SUMMARY

In general, methods and apparatus are provided to enable relatively fast database software version reconciliation in plural nodes of a database system. For example, a method for use in a parallel database system having a plurality of nodes includes determining whether each node has a first version of database software. In addition, a first broadcast message is sent from a first node of the parallel database system to other nodes of the database system. In response to the first broadcast message, each of at least some of the other nodes starts a software module to perform a task with respect to database software executable in each node.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
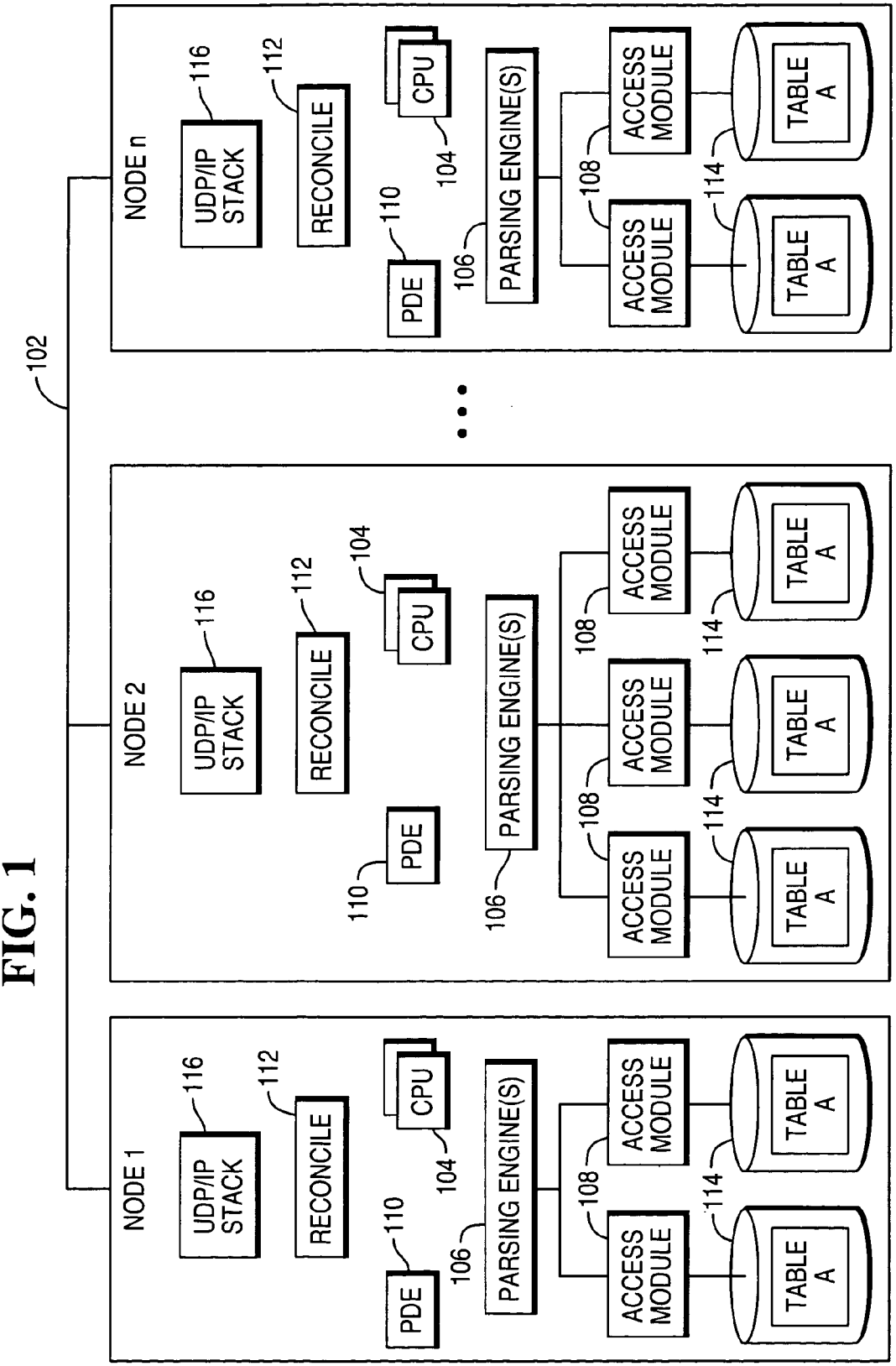
FIG. 1 is a block diagram of an example database system that incorporates an embodiment of the invention.

FIG. 1 shows an example parallel database system that has a plurality of nodes 100. The nodes 100 are interconnected by a network 102. Each node 100 can include one or multiple central processing units (CPUs) 104. Each node 100 also contains database software, which accordance to some embodiments includes a parsing engine 106, plural access modules 108, a parallel database extension (PDE) module 110, and a reconcile module 112. Each of the modules 106, 108, 110, and 112 is considered to be a "database software module." Thus, in this context, database software includes modules that perform access of data stored in storage modules 114, as well as utilities and other software modules that are associated with the database software, such as the PDE module 110 and reconcile module 112. The PDE module 110 performs various management tasks, including memory management, control of parallel services, lock management, and so forth.

The reconcile module 112 performs software version reconciliation to ensure that the version of database software running on each of the nodes 100 is the same software version. In other words, the reconcile module 112 detects for nodes 100 that are running different versions of database software. The reconcile module 112 prevents such nodes that are running different versions of database software from starting up so that such nodes remain inactive while the rest of the parallel database system continues to run.

Versions of database software loaded on each node parallel database system may change over time as database operators or administrators perform upgrades of the database software. The reconcile module 112 in each node 100 enables a database operator or administrator to perform "switching" of database software from one version to another in each node. To ensure that the switching of database software versions has been successfully performed, the reconcile module 112 performs a check of the version of database software running on each node 100 to ensure consistency across the nodes of the parallel database system. Any node that runs a different version of database software is not started such that only a subset of the nodes of the parallel database system that run the same version of database software is started.

Each access module 108 of a node 100 manages access of data stored in a respective storage module 114. The storage modules 114, although shown as discrete components, can be part of one storage subsystem. Examples of tasks performed by each access module 108 includes the following: inserting, deleting, or modifying contents of tables stored in respective storage modules 114; creating, modifying, or deleting definitions of tables; retrieving information from definitions and tables; and locking databases and tables. In one embodiment, each access module 108 is based on an access module processor (AMP) used in some TERADATA® database systems from NCR Corporation. Although each of the nodes 100 is shown with multiple access modules 108, it is contemplated that some of the nodes 100 may contain a single access module 108. Each table stored in the database system is distributed across the multiple storage modules 114. Thus, for example, Table A is partitioned and distributed such that a different portion of Table A resides on each storage module 114. In this way, in response to queries submitted by a user or a software application, access modules 108 can concurrently access different portions of Table A to produce the result for the received query.

The parsing engine 106 in each node 100 includes a parser and a scheduler. The parser receives database queries, parses the received queries, and generates executable steps. The scheduler sends the executable steps generated by the parser to the access modules 108. Although only one parsing engine 106 is shown in each node 100, it is contemplated that each node 100 can include multiple parsing engines 106 to enable parallel parsing of queries.

In accordance with some embodiments of the invention, each node 100 includes a transport and network protocol stack 116 for communications over the network 102. In the implementation shown in FIG. 1, the transport and network protocol stack is a UDP/IP (User Datagram Protocol/Internet Protocol) stack. UDP provides a procedure for software programs to send messages to other software programs over a network. A version of UDP is described in Request for Comments (RFC) 768, entitled "User Datagram Protocol," dated August 1980. IP defines a network protocol that enables messages to be exchanged between nodes in packets, referred to as IP packets, over a network. One version of IP is IPv4, described in RFC 791, entitled "Internet Protocol," dated September 1981. Another version of IP is IPv6, described in RFC 2460, entitled "Internet Protocol, Version 6 (IPv6) Specification," dated December 1998.

By using the UDP/IP stack 116 according to an embodiment, a connectionless communications mechanism is provided over the network 102. This connectionless mechanism enables one node to communicate with multiple other nodes by use of broadcast messages. In other words, rather than having to establish a point-to-point connection between each pair of nodes, a single node can send a message that can be received by multiple other nodes. The ability to send and receive broadcast messages according to some embodiments allows for certain types of operations to proceed more quickly than if point-to-point connections have to be established between the nodes. A "broadcast message" is a message sent by one network element to plural other network elements over a network. The broadcast message typically includes an indication that the message is intended to be received and processed by multiple recipients. On the other hand, a point-to-point connection is a connection established between a first network element and a second network element over a network, with messages exchanged over the point-to-point connection containing a specific address identifying a single destination network element.

In other embodiments, instead of using the UDP/IP stack 116, other types of transport and/or network protocol elements that provide a broadcast mechanism can be used to send broadcast messages from one node 100 to other nodes.

An operation in the parallel database system of FIG. 1 that uses broadcast messages is the software version reconciliation procedure. Use of the broadcast messages enables the software version reconciliation procedure to be able to more quickly complete. In the reconciliation procedure, one of the nodes 100 of the database system is identified as the master node. In one implementation, the master node is the node with the lowest node identifier. In the example of FIG. 1, n nodes are shown, including node 1, node 2, . . . , and node n. The node with the lowest identifier in this example is node 1, which is identified as the master node. In other implementations, instead of the node with the lowest identifier being used as the master node, some other predetermined node can be used as the master node. Also, if node 1 is determined to be faulty or otherwise not operational, another node can be identified as the master node, such as the node with the next lowest identifier (in this example node 2).

The reconcile module 112 in the master node is able to send broadcast messages to the other nodes of the parallel database system over the network 102. This is accomplished in one embodiment by use of UDP broadcast messages through the UDP/IP stack 116. A UDP broadcast message is carried in an IP packet, which contains an IP header as well as a UDP header. The UDP message contains a special broadcast address to indicate that the UDP message is a broadcast message. The value of the broadcast address is a predefined value.

The UDP broadcast message is received by the reconcile modules 112 in the other nodes (referred to as the slave nodes). In response to the broadcast message, tasks of the reconciliation procedure are performed. In accordance with some embodiments of the invention, a first broadcast message is sent by the master node to the slave nodes to start reconcile modules in the slave nodes. In response to the first broadcast message, the slave nodes start reconcile modules and respond with their respective unique slave identifiers. A second broadcast message is sent by the master node to the slave nodes to start other database software module(s), such as the PDE module 110, in selected nodes (those nodes that run the same version of database software).

In some implementations, for security reasons, the reconcile module in the master node cannot be executed in response to the first broadcast message. Rather, in these implementations, the reconcile module in the master node has to be started by a specified user command. This is to prevent an unauthorized hacker from remotely invoking a reconciliation procedure in the database system.

Figure 2A:
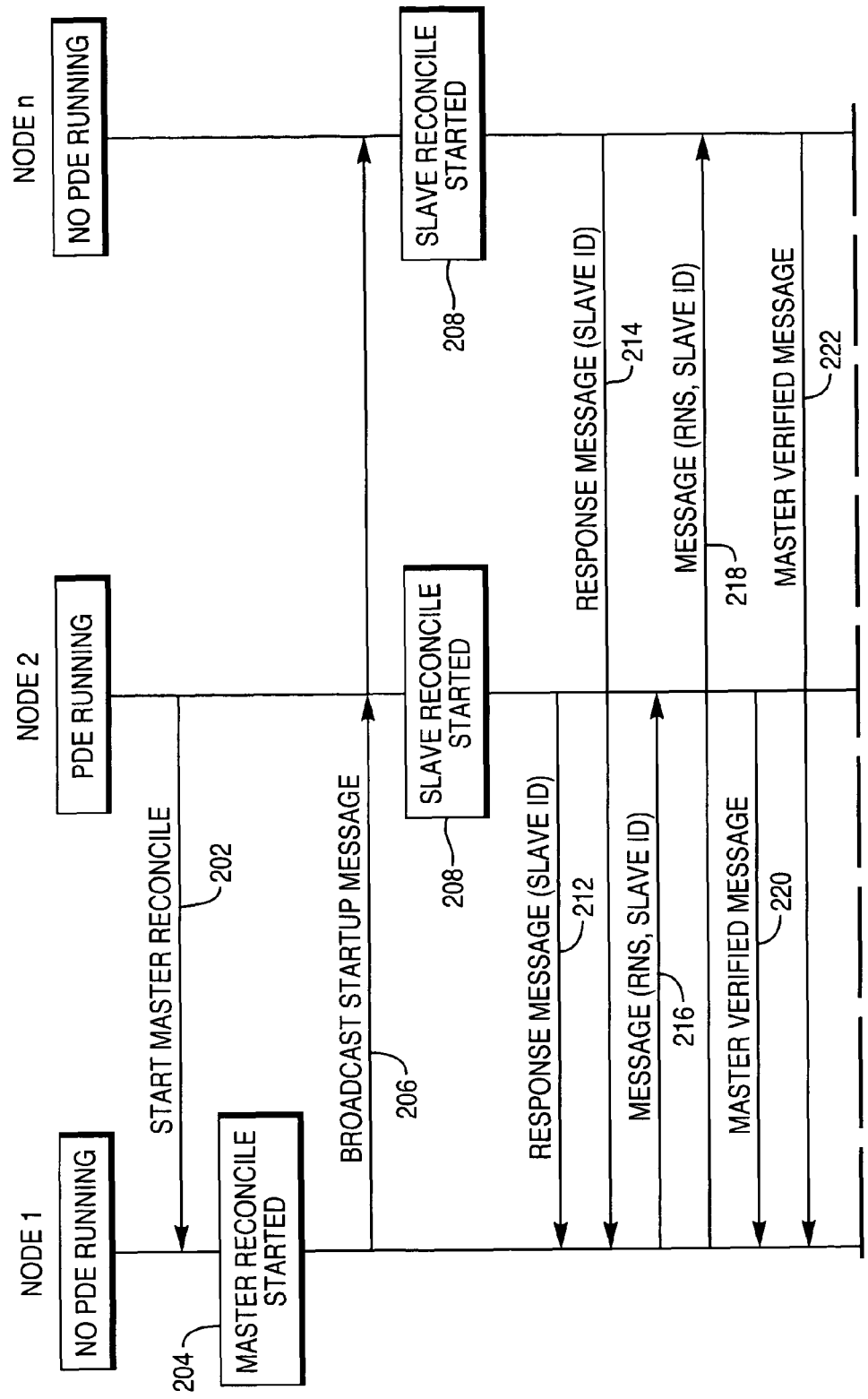
FIGS. 2A-2B depict a message flow diagram of messages exchanged among plural nodes of the parallel database system to perform software version reconciliation, in accordance with an embodiment.
Figure 2B:
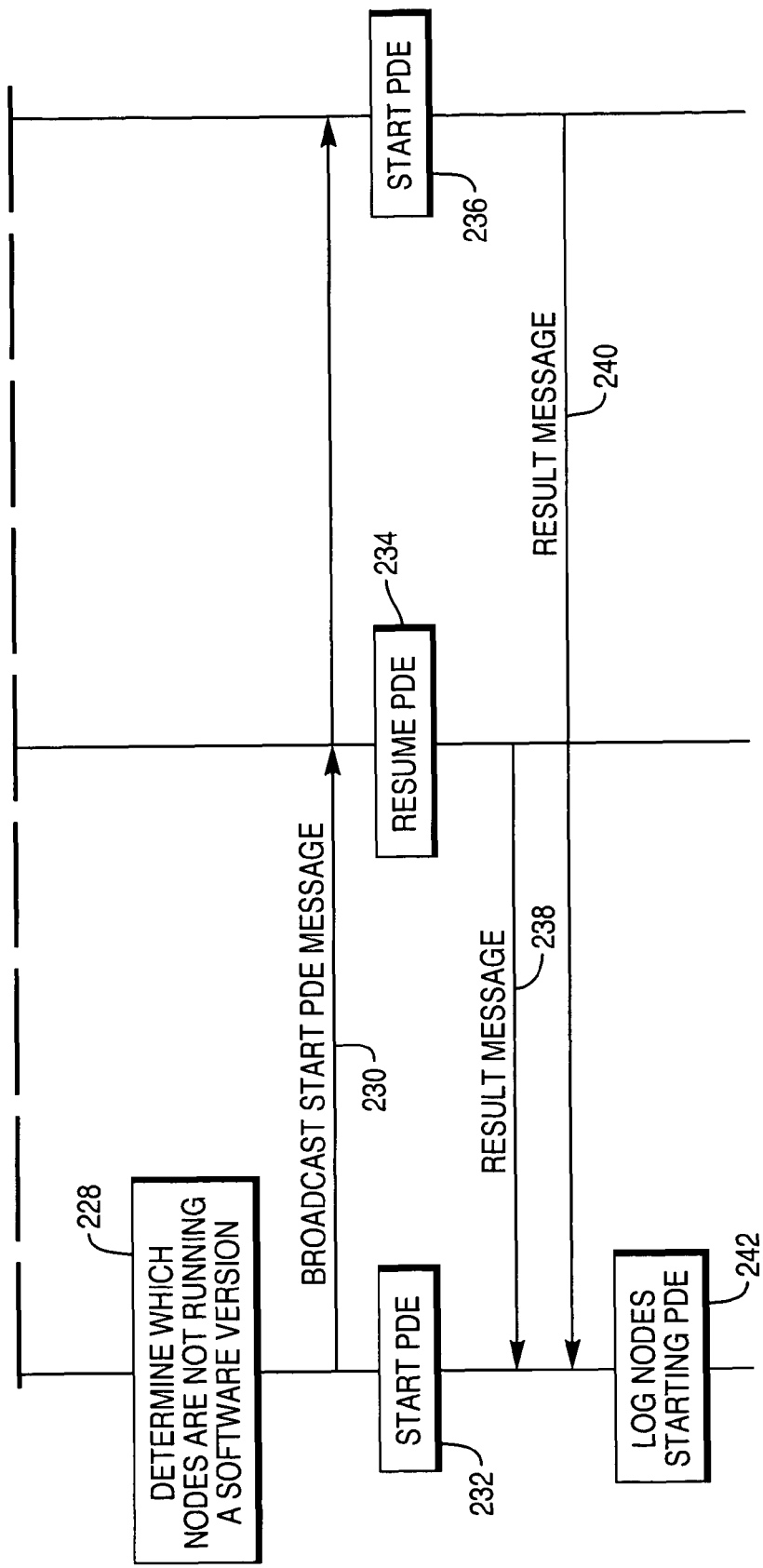

The reconciliation procedure according to an embodiment is shown in FIGS. 2A-2B. In the example of FIGS. 2A-2B, node 1 is the master node. Also, a PDE module is not running in node 1, but a PDE module 110 is running in node 2. Also, in this example, no PDE module is running in node n. The procedure illustrated in FIGS. 2A-2B is started by a restart procedure, such as in response to a user command entered in a user interface coupled to the parallel database system. In performing the restart, a command is sent to start the reconcile module 112 in the nodes 100 with a special flag set to indicate that the reconcile modules are being invoked by a system restart. The user command may have been issued by a database operator or administrator after database software has been upgraded in some or all of the nodes 100 of the database system.

In one implementation, at system restart, each node with a running PDE module 110 can start a respective reconcile module 112. Thus, in the example of FIGS. 2A-2B, a reconcile module cannot be started in node 1, but a reconcile module 112 can be started in node 2. Also, no reconcile module can be started in node n, because a PDE module is not running in node n. To address the issue of no reconcile module running in the master node, node 2 sends (at 202) a command to start the reconcile module 112 in the master node. In response to this command, the reconcile module 112 (master reconcile module) is started (at 204) in the master node.

In different embodiments, the reconcile module 112 does not have to be started by PDE module 110, but rather can be started in another manner.

Once started, each reconcile module is able to access a list of operational nodes (nodes that are able to operate in the database system), which can be stored in an operational node list. Based on this operational node list, the reconcile modules that have been started (such as the one in node 2) are able to determine which nodes are operational and thus determine which node should be the master node (in this example node 1). The command to start the reconcile module in the master node sent at 202 can be sent by node 2 regardless of whether a reconcile module has already been started in the master node. Alternatively, node 2 can wait for some predetermined timeout period to expire before sending the command to the start the reconcile module in the master node. In the latter case, node 2 sends the command to start the reconcile module in the master node after the timeout period if the master node does not send some type of indication that the reconcile module in the master node has been started. In another scenario, neither node 1 nor node 2 has a reconcile module running. In this case, nodes having higher node identifiers each waits some respective predetermined timeout period for some indication that the reconcile module in the master node has been started—if such an indication is not received, one of these nodes with a higher node identifier sends the command to start the reconcile module in the master node.

Once started, the master reconcile module 112 sends a broadcast startup message (at 206) to slave nodes (node 2 and node n in FIG. 2A). In response to the broadcast startup message, the slave nodes each start a reconcile module. Note that, in some of the nodes, the reconcile module has already been started by a running PDE module 110. However, in other modules that do not already have a running PDE module, the reconcile module has to be started by the broadcast startup message sent at 206. The broadcast startup message ensures that a reconcile module is started in each of the slave nodes.

Once the reconcile module is started in each of the slave nodes, each slave node sends (at 212, 214) a response message to the master reconcile module. The response message sent at 212 and 214 are sent in a point-to-point communication established between a respective slave node and the master node. Each response message contains the slave identifier (slave ID) of the slave node from which the slave reconcile module sent the response message. The slave ID of each node is a unique ID. After receiving the unique slave IDs from the slave nodes, the master reconcile module processes the slave IDs and sends a message back (at 216, 218) to each of the slave nodes (in point-to-point communications). Each of such messages contains the slave ID (of the target slave node) and a unique random number seed. The master reconcile module 112 sends back the unique slave ID to each slave node so that the slave node knows that the slave node is communicating with a secure master node. Also, the random number seed, which is created at run-time, is used to provide secure UDP/IP communications. The unique random number seed is used in each slave node to generate a list of random numbers. The random numbers generated from the unique random number seed are used in subsequent communications by the nodes to ensure that messages are sent from an authorized source.

In response to the messages sent at 216 and 218 by the master node, the slave nodes respond with respective master verified messages (at 220, 222) to indicate that the slave nodes have verified the master reconcile module. The master verified messages are also sent in point-to-point communications. The master verified messages are also sent in point-to-point communications along with the information pertaining to the software version in each slave node.

After receiving the software version information, the master reconcile module 112 determines (at 228) which nodes are not running a particular version of database software. For example, a database operator or administrator may desire to switch to a particular version of database software. If certain of the nodes are not running the particular version of the database software, then such nodes should not be started up by the parallel database system to avoid inconsistencies in operation and possibly data loss during database operations. The nodes not running the particular version of the database software are removed from a node start list. The node start list contains identifiers of nodes that are to be started for the parallel database system. Nodes that are not identified in the node start list are not started by the restart operation.

The master reconcile module 112 sends (at 230) a broadcast start PDE message to all the nodes of the database system (including the master node itself). The broadcast start PDE message contains the node start list as well as a random number. The random number is used by each slave node to confirm that the broadcast start PDE message is actually received from the master node (not from some other unauthorized node, such as an outside hacker). In response to the broadcast start PDE message, node 1 starts (at 232) its PDE module 110, node 2 resumes (at 234) its PDE module (since the PDE module is already running in node 2), and node n starts (at 236) its PDE module. The slave nodes send (at 238, 240) result messages back to the master node. The result messages are sent in point-to-point communications, and indicate the result of the start PDE procedure. In response to the result messages, the master reconcile module logs (at 242) the nodes that have started respective PDE modules.

By using broadcast messages to start reconcile modules in slave nodes as well as to start other database software module (s), such as a software module to perform management tasks with respect to the database software (e.g., the PDE module 110), the amount of time taken to perform reconciliation tasks can be reduced. In a database system having a relatively large number of nodes, the difference in the number of messages that have to be exchanged (number of messages sent if broadcast messaging can be employed versus number of messages sent if only point-to-point connections can be used) can be substantial.

Instructions of the various software routines or modules discussed above (such as the reconcile module 112, PDE module 110, parsing engine(s) 106, access modules 108, and so forth) are executed on corresponding CPUs. The CPUs include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method implemented in a parallel database system having a plurality of nodes, comprising:
    sending a first broadcast message from a first node of the parallel database system to other nodes of the database system;
    in response to the first broadcast message, at least some of the other nodes each starting a reconcile software module to perform a database software version reconciliation task with respect to database software executable in each node, wherein the database software version reconciliation task involves checking a version of the database software executable in each of the other nodes;
    in response to the first broadcast message, the at least some of the other nodes each sending, to the first node, a unique identifier of the respective one of the at least some of the other nodes;
    sending a second broadcast message containing a random number from the first node to the other nodes; and
    in response to the second broadcast message, the other nodes confirming that the first node is authorized based on the random number.

2. The method of claim 1, further comprising the reconcile software module in each of the at least some of the other nodes sending information relating to a version of the database software back to the first node.

3. The method of claim 2, further comprising the first node determining which nodes are running a first version of the database software based on the information relating to the version of the database software sent by the at least some of the other nodes.

4. The method of claim 3, wherein the second broadcast message causes starting of database software in nodes running the first version of the database software.

5. The method of claim 2, further comprising:
    the first node determining whether the at least some of the other nodes have database software of a first software version based on the software version information from at least some of the other nodes.

6. The method of claim 5, further comprising:
    the first node removing identifiers of nodes not running database software of the first software version from a start list;
    the first node sending the start list to all nodes in the second broadcast message;
    each node having an identifier in the start list starting a corresponding database software module; and
    each node not having an identifier in the start list not starting a corresponding database software module.

7. An article comprising at least one machine-readable storage medium containing instructions that when executed cause a database system having a plurality of nodes that include central processing units to:
    send a first broadcast message from a first node to other nodes of the database system;
    in response to the first broadcast message, start, by each of the other nodes, a reconcile software module to perform a database software reconciliation task with respect to database software executable in each of the other nodes, wherein the database software version reconciliation task involves checking a version of the database software executable in each of the other nodes;
    in response to the first broadcast message, send, from each of the other nodes of the database system to the first node, a corresponding identifier of each of the other nodes;
    send, from the first node to the other nodes, a second broadcast message to start a database software module in each of the other nodes, the second broadcast message containing at least one of one or more random numbers; and
    verify, based on the at least one of the one or more random numbers, that a source of the second broadcast message is the first node.

8. The article of claim 7, wherein the instructions when executed cause the database system to further send, from each of the other nodes to the first node, information pertaining to the version of database software in the node, wherein sending the information pertaining to the version of the database software is part of the database software reconciliation task.

9. The article of claim 8, wherein the instructions when executed cause the database system to further:
    determine, in the first node, which of the other nodes has a first version of the database software;
    generate a list of nodes that have the first version of the database software, the list containing identifiers of nodes that have the first version of the database software;
    send the list, from the first node to the other nodes in the second broadcast message; and
    starting, in each of the other nodes that has an identifier in the list, a database software module in the respective node.

10. A database system, comprising:
    a plurality of nodes having central processing units (CPUs); and
    database software executable on one or more CPUs in each of the nodes, wherein the nodes comprise a master node and a plurality of slave nodes,
    the master node to send a broadcast message to the plurality of slave nodes to start a software module to perform a task with respect to the database software in each of the slave nodes, wherein the software module started in each of the slave nodes in response to the broadcast message is a reconcile software to perform a database software reconciliation task in each of the slave nodes, wherein the database software version reconciliation task involves checking a version of the database software executable in each of the slave nodes,
    wherein the broadcast message is according to a protocol that provides connectionless communication between the master node and the plurality of slave nodes, and
    the plurality of slave nodes to respond to the broadcast message with respective unique identifiers of the slave nodes,
    the master node to further:

send, to the plurality of slave nodes, a second broadcast message to start a database software module in each of the slave nodes, the second broadcast message containing at least one of one or more random numbers; and verify, based on the at least one of the one or more random numbers, that a source of the second broadcast message is the master node.

11. The database system of claim 10, wherein the reconcile module in each of the slave nodes is to send information pertaining to the version of the database software in the corresponding slave node to the master node.

12. The database system of claim 11, the master node to determine, based on the information from the slave nodes, which of the slave nodes has a first version of the database software.

13. The database system of claim 12, the master node to generate a list of identifiers of nodes in the database system that have the first version of the database software, wherein the second broadcast message contains the list.

14. The method of claim 1, wherein sending the first broadcast message comprises sending a User Datagram Protocol (UDP) broadcast message.

15. The method of claim 1, wherein sending the first broadcast message uses a protocol that provides connectionless communication between the first node and the other nodes.

16. The method of claim 1, further comprising:
the first node sending a random number seed to each of the other nodes; and
each of the other nodes generating at least one random number based on the random number seed.

17. The article of claim 7, wherein sending the first broadcast message uses a protocol that provides connectionless communication between the first node and the other nodes.

18. The database system of claim 10, wherein the broadcast message comprises a User Datagram Protocol broadcast message.

* * * * *